United States Patent [19]

Machida et al.

[11] Patent Number: 5,393,587
[45] Date of Patent: Feb. 28, 1995

[54] CURVED HONEYCOMB STRUCTURAL BODIES

[75] Inventors: Minoru Machida, Nagoya; Masaomi Kamiya, Chiryu, both of Japan

[73] Assignee: NGK Insulators, Ltd., Japan

[21] Appl. No.: 149,728

[22] Filed: Nov. 10, 1993

[30] Foreign Application Priority Data

Nov. 20, 1992 [JP] Japan .................................. 4-312181

[51] Int. Cl.⁶ .............................................. B32B 3/12
[52] U.S. Cl. ..................................... 428/116; 428/188
[58] Field of Search ....................... 428/116, 118, 188; 502/527; 264/177.12

[56] References Cited

U.S. PATENT DOCUMENTS

| | | | |
|---|---|---|---|
| 4,233,351 | 11/1980 | Okumura et al. | 428/116 |
| 4,578,303 | 3/1986 | Kundinger et al. | 428/116 |
| 4,777,070 | 10/1988 | Huvey | 428/116 |
| 4,840,827 | 6/1989 | Mizutani et al. | 428/116 |

FOREIGN PATENT DOCUMENTS

52-78965  7/1977  Japan .................................. 428/116

*Primary Examiner*—Henry F. Epstein
*Attorney, Agent, or Firm*—Parkhurst, Wendel & Rossi

[57] ABSTRACT

A curved honeycomb structural body having a number of through holes penetrating along a direction in which the honeycomb structural body is curved. Pitches between adjacent interior partition walls defining through holes are set smaller on a radially outer side of a curved portion than on a radially inner side thereof.

8 Claims, 8 Drawing Sheets

FIG_3

FIG_4

FIG_5

FIG_11

FIG_12

CURVED HONEYCOMB STRUCTURAL BODIES

BACKGROUND OF THE INVENTION (1) Field of the Invention

The present invention relates to curved honeycomb structural bodies formed by extruding a molding material such as a ceramic or a resin.

(2) Related Art Statement

In general, honeycomb structural bodies having a number of through holes are molded by extrusion. It is not easy for molding engineers to produce such honeycomb structural bodies by a process other than the extruding process.

Therefore, in the conventionally known honeycomb structural bodies which are molded by extruding a material such as a ceramic or a resin, straight passages (through holes) are usually formed in an extruding direction.

Although a concept (configuration) of a honeycomb structural body having a curved shape can be illustrated and represented, such a curved honeycomb structural body cannot be easily actually produced. This is clear in view of the fact that it is difficult to finely define and constitute a number of curved passages with walls having a uniform thickness.

For example, as is disclosed in Japanese Patent application Laid-open No. 52-78,965, a process is known for producing curved honeycomb structural bodies, in which lengths of passages of a die itself in an extruding section of an extruder are variable to curve the honeycomb structural body toward a side of longer straight passages having a larger flow resistance during extruding.

However, according to this curved honeycomb structural body-producing process, since the pitches of the interior partition walls of the extruding die are constant, a cross sectional area of an opening of every through hole penetrating the honeycomb structural body along a curved direction is constant.

Figure 8:
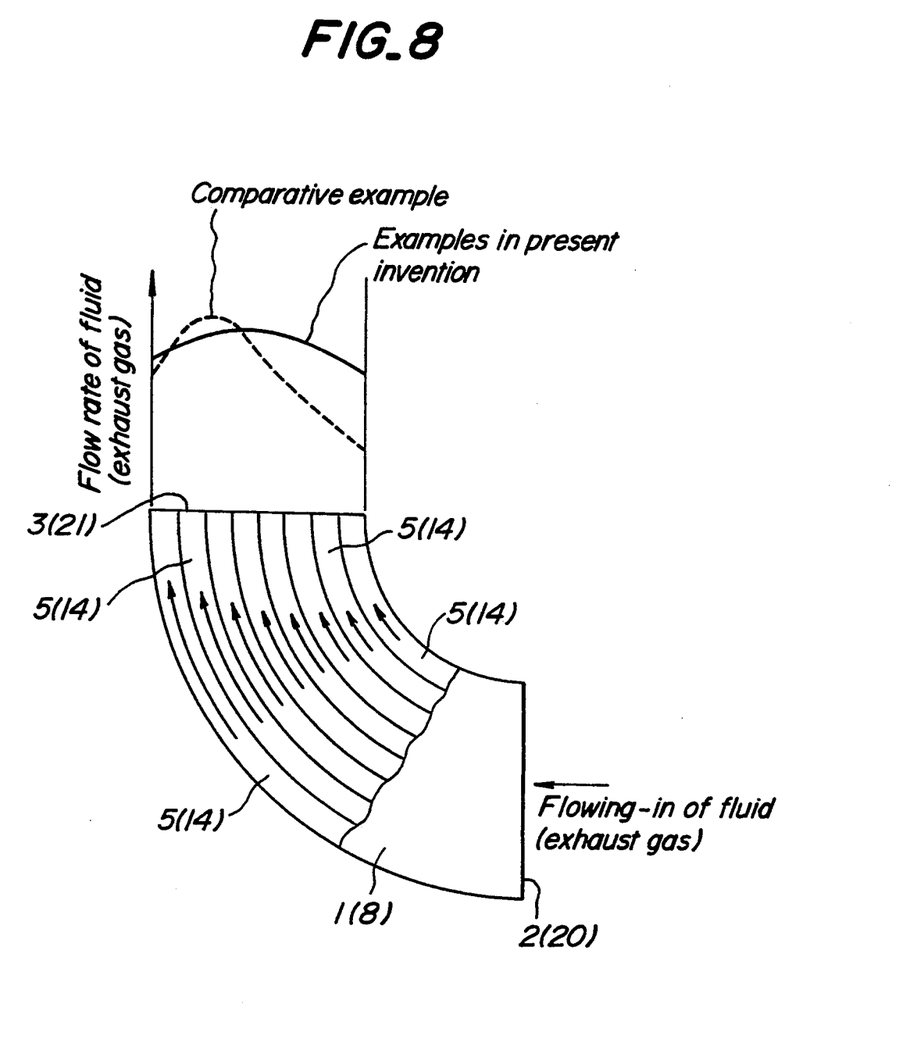
FIG. 8 is a view for illustrating flow rate distributions in the first embodiment of the present invention and Comparative Example.

Therefore, the curved honeycomb structural bodies produced by this method have peculiar problems which do not exist in the straight honeycomb structural bodies. That is, when a fluid is flown into the curved honeycomb structural body through all curved passages (through holes) at one end face (an end face at an inlet side), the flow rate of the fluid coming out from the other end face (an end face on an outlet side) varies depending upon locations at the end face on the outlet side. As is shown in FIG. 8, it can be understood that the flow velocity (the flow rate) of the fluid flowing through a number of the through holes 5 penetrating from the end face 2 on the inlet side to the end face 3 on the outlet side of the curved honeycomb structural body 1 is greater on the radially outer side than on the radially inner side because of inertia of the fluid.

According to the present inventors' experiments, when the curved honeycomb structural body is used as a catalyst carrier in a catalyst device, it was made clear that an efficiency for purifying exhaust gases with the catalyst decreases as compared with the conventional straight honeycomb structural bodies. For example, if the catalytic power per unit surface area of the catalyst carried on the inner walls of the through holes 5 of the curved honeycomb structural body 1 is constant (uniform) over every portion, the purifying rate for the gas passing through those curved passages in which the flow rate of the gas is relatively higher (the flow amount is greater) is smaller as compared with the purifying rate of the gas passing through those curved passages in which the flow rate of the gas is slower. Therefore, the purifying rate of the fluid passing through the curved honeycomb structural body 1 becomes non-uniform depending upon the locations at the end face on the outlet side. This is considered as one of causes to reduce the purifying efficiency.

SUMMARY OF THE INVENTION

It is an object of the present invention to provide a curved honeycomb structural body which makes uniform the flow rate of a fluid passing through curved passages of the honeycomb structural body from one end face to the other end face over the other end face. It is another object of the present invention to provide a curved honeycomb honeycomb structural body which enhances a purifying efficiency of exhaust gas with a catalyst.

In order to attain the above object, the curved honeycomb structural body according to the present invention is characterized in that the curved honeycomb structural body has a number of through holes penetrating along a direction in which the honeycomb structural body is curved, and pitches between adjacent interior partition walls defining through holes are set smaller on a radially outer side of a curved portion than on a radially inner side thereof.

In the present invention, the following are preferred.
 (i) The pitches of the adjacent interior partition walls are gradually decreased linearly or stepwise as the interior partition walls go from the radially inner side to the radially outer side.
 (ii) The cross-sectional shape of each of the through holes is square, rectangular, triangular or hexagonal. However, any other cross sectional shape may be employed for the through holes.
 (iii) When the cross sectional shape of each of the through holes is square, the pitches of the interior partition walls extending in a direction orthogonal to the radial direction in a cross sectional plane are constant. This is because an extruding die therefor can be more easily produced as compared with an extruding die for the production of a honeycomb structural body in which the pitches of the interior partition walls extending in a direction orthogonal to the radial direction in a cross sectional plane are varied.
 (iv) When the cross sectional shape of each of the through holes is square, the pitch of each of the interior walls extending in the direction orthogonal to the radial direction in the cross sectional plane has an intermediate value between a maximum pitch and a minimum pitch between adjacent interior partition walls extending in the radial direction. This is because an extruding die therefor can be more easily produced as compared with an extruding die for the production of a honeycomb structural body in which the cross sectional shape of each of the through holes is square, the pitch of each of the interior walls extending in the direction orthogonal to the radial direction in the cross sectional plane has an intermediate value between a maximum thickness and a minimum pitch between adjacent interior partition walls extending in the radial direction.

(v) A catalyst is carried on surfaces of the interior partition walls.

(vi) The pitches of the interior partition walls extending in a direction orthogonal to the radial direction in a sectional view are gradually decreased as the interior partition walls go from the radially inner side to the radially outer side.

(vii) The pitches of the interior partition walls extending in a direction orthogonal to the radial direction in a sectional view are linearly or stepwise decreased as the interior partition walls go from the radially inner side to the radially outer side.

According to the curved honeycomb structural body of the present invention, the pitches between the adjacent interior partition walls constituting the through holes are set smaller on the radially outer side of the curved portion than on the radially inner side thereof. In general, when a fluid is flown into the honeycomb structural body from one end face (the end face at the inlet side), the flow rate of the fluid tends to be greater due to centrifugal forces on the radially outer side than on the radially inner side. However, according to the present invention, since the sectional areas of the passages in the through holes are smaller on the radially outer side than on the radially inner side, the distribution of the flow rate of the fluid passing through the through holes and flowing out from the other end (the end at the outlet side) can be made almost uniform over the radially inner side to the radially outer side.

These and other objects, features and advantages of the present invention will be appreciated upon reading the following description of the invention when taken in conjunction with the attached drawings, with the understanding that some modifications, variation or changes could be made by the skilled person in the art to which the invention pertains, without departing from the spirit of the invention or the scope of claims appended hereto.

BRIEF DESCRIPTION OF THE ATTACHED DRAWINGS

For a better understanding of the invention, reference is made to the drawings, wherein.

DETAILED DESCRIPTION OF THE PRESENT INVENTION

In the following, specific embodiments of the present invention will be explained with reference to the attached drawings.

Figure 1:
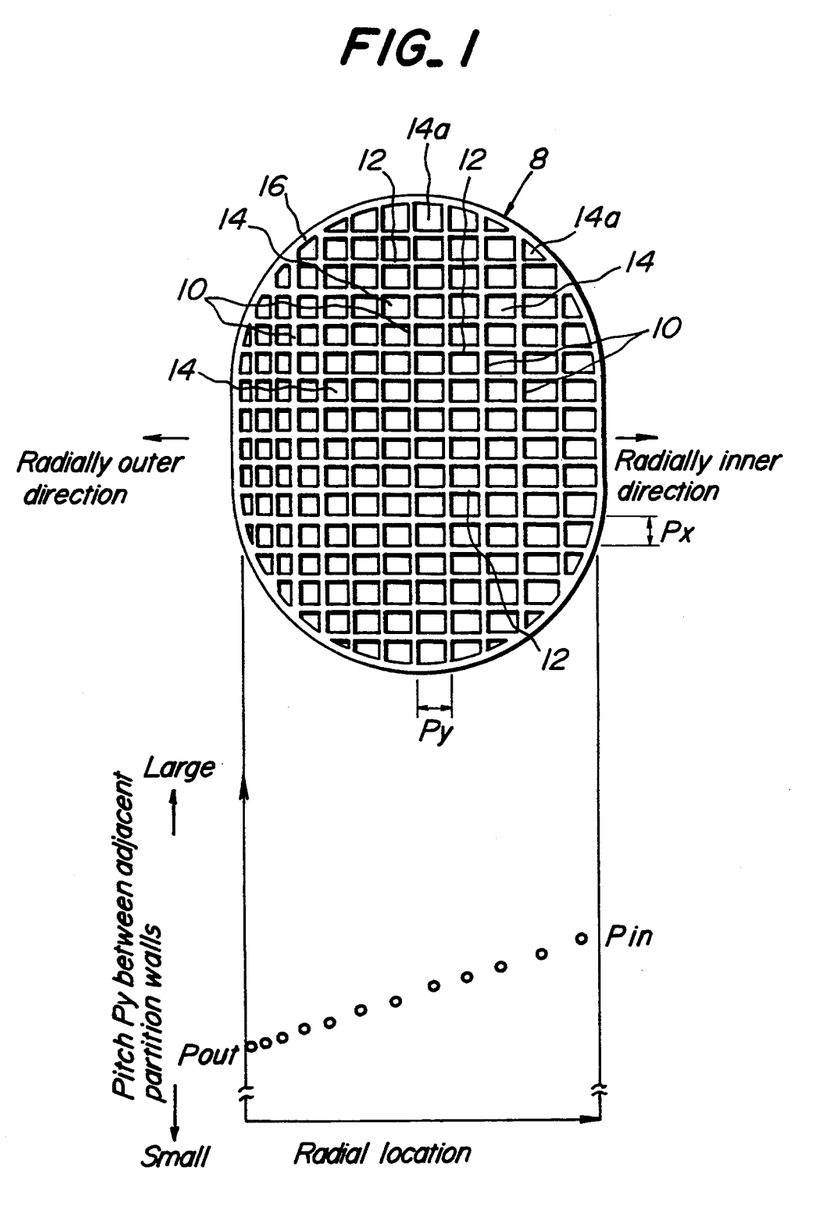
FIG. 1 is a view for illustrating a sectional shape of a first embodiment of the curved honeycomb structural body according to the present invention and a characteristic of pitches between adjacent interior partition walls.
Figure 2:
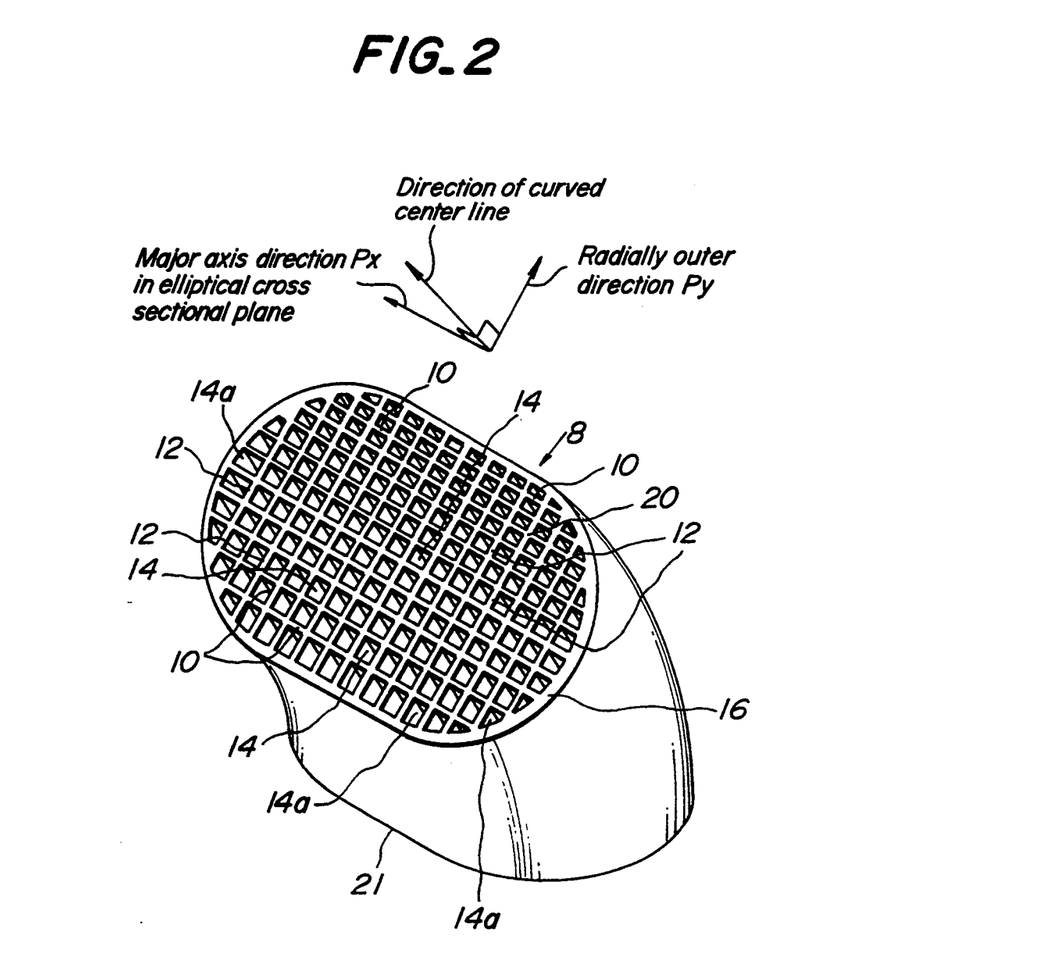
FIG. 2 is a perspective view for illustrating the first embodiment of the curved honeycomb structural body.

FIGS. 1 and 2 show a first embodiment of the curved honeycomb structural body according to the present invention which is to be applied to a catalyst converter connected to an exhaust pipe in an automobile engine.

In a curved honeycomb structural body 8 as the first embodiment, shapes of cells (cross-sectional shapes of through holes) are square, and the honeycomb structural body has the following structure. That is, a number of through holes (curved passages) 14 are formed by crossing interior partition walls 10 extending in a direction of a major axis and interior partition walls 12 extending in a direction of a minor axis in a lattice fashion as viewed in an elliptical cross sectional plane. Each of the interior partition walls 10 and 12 extends in a direction of a curved center axis. As shown in FIG. 2, each of the curved passages 14 defined by the crossing interior partition walls 10 and 12 extends in parallel to a curved direction of the honeycomb structural body, and penetrates the honeycomb structural body from one end 20 to the other end face 21. An outer peripheral portion of the honeycomb structural body is constituted in an elliptical annular form by an outer peripheral wall 16 having a given thickness to close through holes 14a positioned on an outermost side.

The pitches P between the adjacent interior partition walls constituting the through holes 14 are as follows. That is, (1) the pitches Px between the adjacent interior partition walls 12, 12 in a direction of a major axis in an elliptical sectional plane are constant. This is because the radius of curvature of the curved honeycomb structural body is constant in the major axis direction in the elliptical sectional plane, and therefore the flow rate is uniform as viewed in the major axis direction. (2) The pitches Py between the adjacent interior partition walls 10, 10 in the radial direction of a curved portion decreases linearly as the interior partition walls go from the radially inner side to the radially outer side. The relationship between the radial location of the through hole 14 and the pitch Py between the adjacent interior partition walls is as shown in FIG. 1. The pitch Py between the adjacent interior partition walls is a minimum pitch Pout (Pmin) on the radially outermost side. The pitches Py between the adjacent interior partition walls continuously increase as the interior partition walls go from the radially outermost side toward the radially inner side, and the pitch Py takes a maximum pitch Pin between the interior partition walls on the radially innermost side (Pmax, Pout<Pin).

Next, with respect to the above first embodiment of the present invention and Comparative Example, their flow rate change distribution characteristics are compared when an exhaust gas is flown through the honeycomb structural body from an inlet side end to an outlet side end thereof. As Comparative Example, use was made of a curved honeycomb structural body in which pitches Px between adjacent interior partitions in a direction of a major axis in an elliptical sectional plane are made constant and pitches Py between adjacent interior partitions in a direction of a minor axis in the elliptical sectional plane are also made constant. The other construction is the same as that in the first embodiment.

Results are shown in FIG. 8. According to the first embodiment of the present invention, as shown in FIG. 8, the flow rate distribution of the exhaust gas emitted from the outlet end face is almost uniform over an entire area from the radially inner side to the radially outer side. To the contrary, in the above Comparative Example, since the pitches are uniform over the entire range from the radially inner side to the radially outer side, a conspicuously mountainous flow rate distribution occurred in which the flow rate was greater on the radially outer side owing to centrifugal forces caused by inertia of the exhaust gas.

Figure 3:
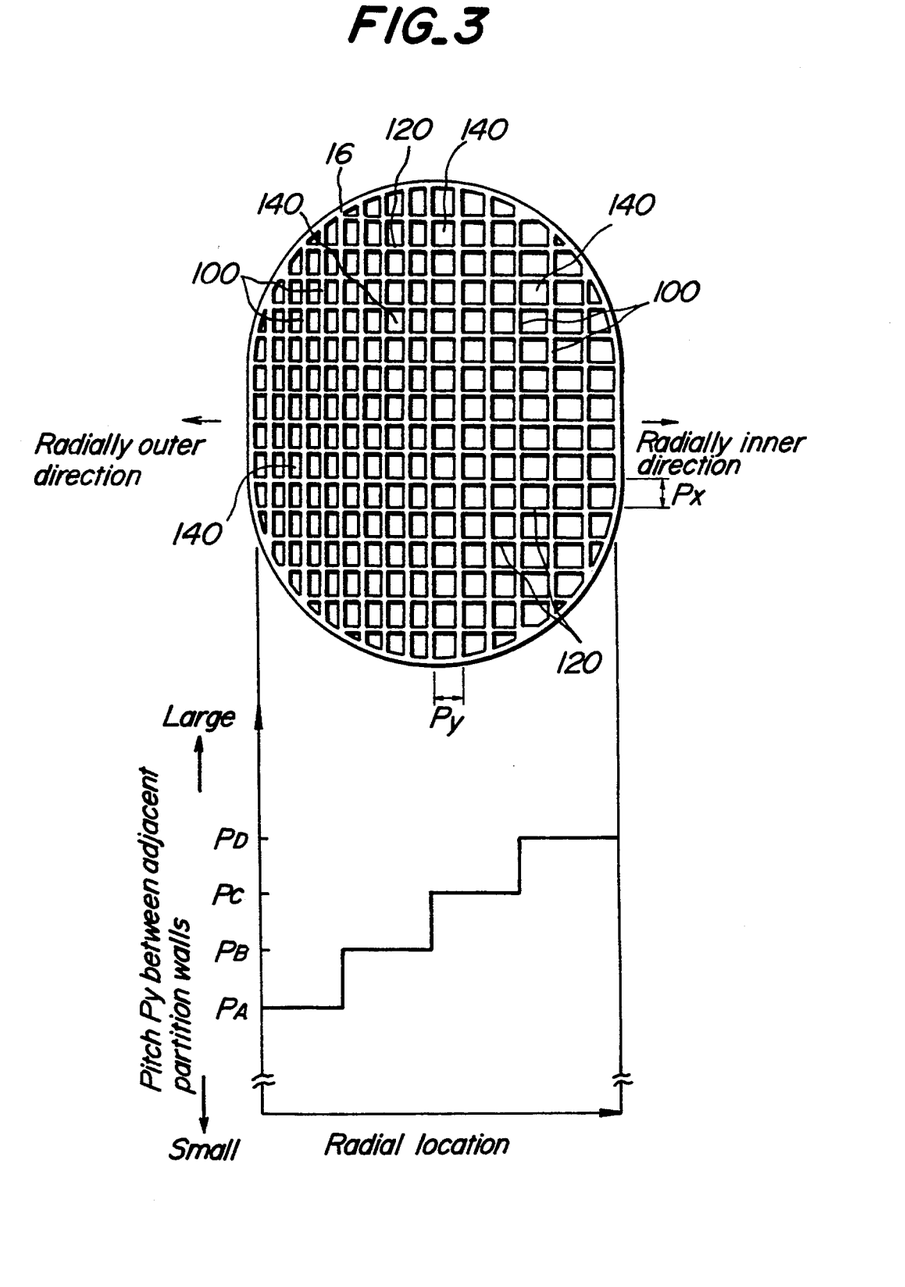
FIG. 3 is a view for illustrating a sectional shape of a second embodiment of the curved honeycomb structural body according to the present invention and a characteristic of pitches between adjacent interior partition walls.
Figure 4:
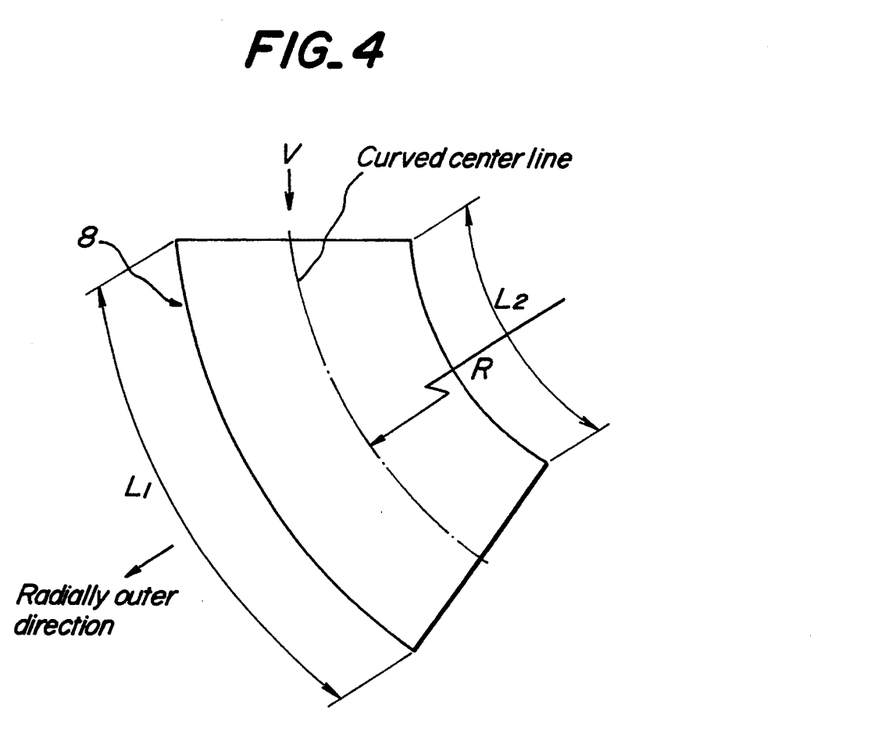
FIG. 4 is a schematic view for illustrating the structure of Example 1 tested in the present invention.
Figure 5:
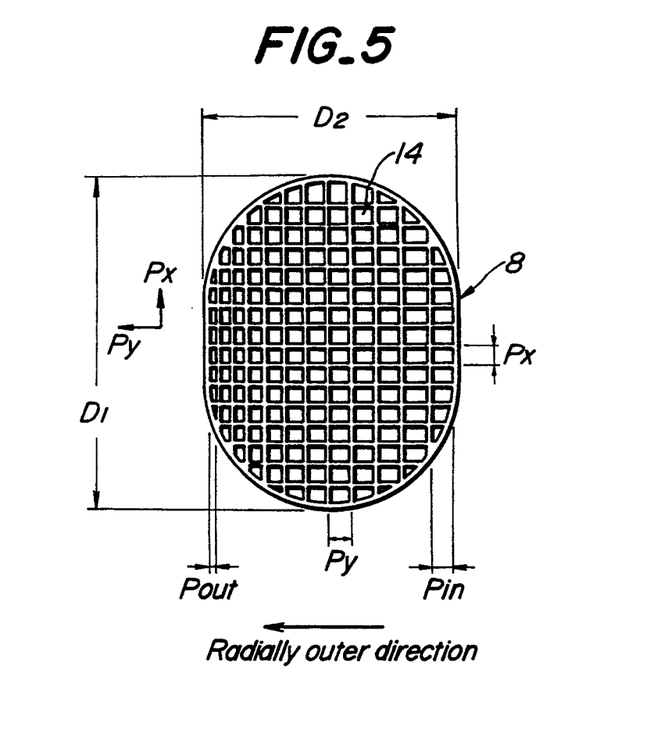
FIG. 5 is a sectional view of FIG. 4 as viewed from a direction of an arrow V.

Next, a second embodiment of the curved honeycomb structural body according to the present invention is shown in FIG. 3. In this embodiment, the pitches between adjacent interior partition walls are decreased stepwise as the interior partition walls go from the radially inner side to the radially outer side.

The pitches P between the adjacent interior partition walls constituting through holes 140 are as follows. That is, (1) the pitches Px between the adjacent interior partition walls 120, 120 in a direction of a major axis in an elliptical sectional plane are constant. This is because the radius of curvature of the curved honeycomb structural body is constant in the major axis direction in the elliptical sectional plane and therefore the flow rate is uniform as viewed in the major axis direction. (2) The pitches Py between the adjacent interior partition walls 100, 100 in the radial direction of a curved portion decreases stepwise as the interior partition walls go from the radially inner side to the radially outer side. The relationship between the radial location of the through hole 140 and the pitch Py between the adjacent interior partition walls is also shown in FIG. 3. The pitches Py between the adjacent interior partition walls in the radial direction are minimized as a pitch $P_A$ on the radially outermost side. The pitch Py is successively increased to $P_B$ and $P_C$ as the pitches between the adjacent interior partition walls go from the radially outer side to the radially inner side. The pitch Py takes a maximum pitch $P_D$ between the interior partition walls on the radially innermost side. The pitches are varied by totally four stages.

According to this second embodiment, since the pitches Py between the adjacent interior partition walls in the radial direction are varied stepwise, an extruding die for the formation of the curved honeycomb structural body can be more easily manufactured as compared with an extruding die for the formation of the first embodiment.

Figure 9:
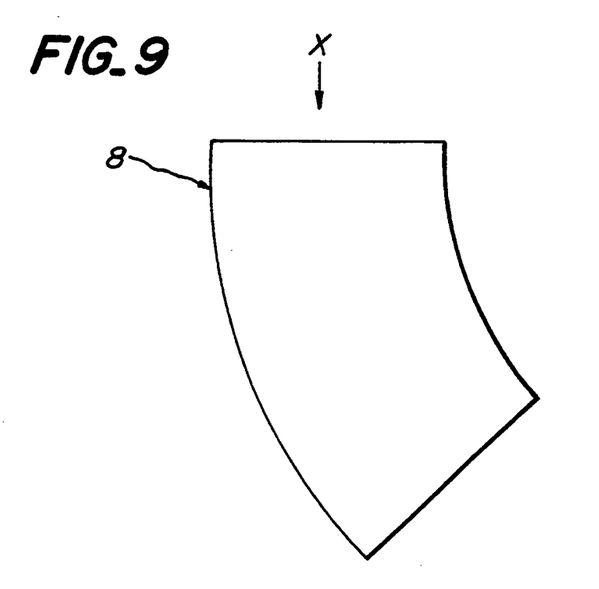
FIG. 9 is a schematic view for illustrating the structure of Example 3 tested in the present invention.
Figure 10:
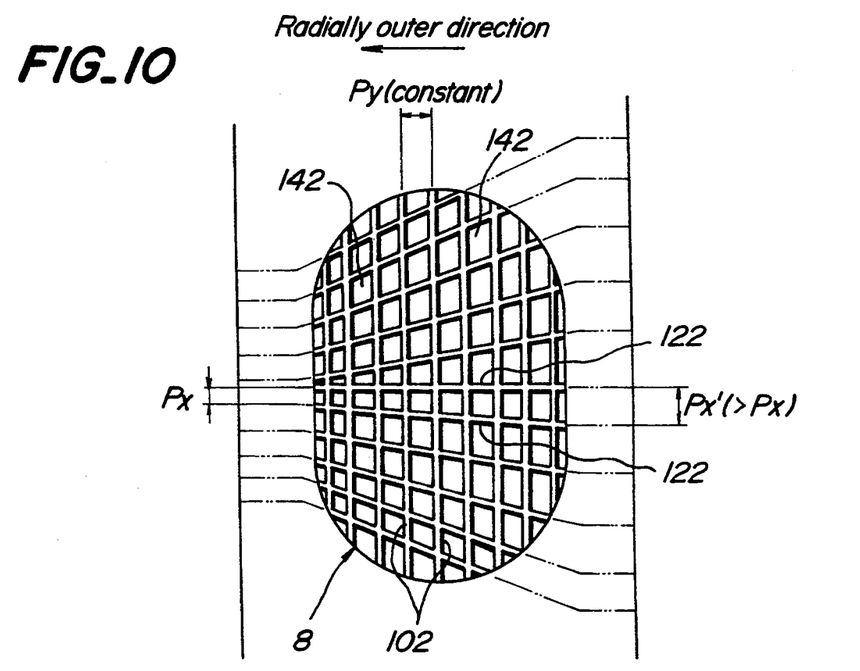
FIG. 10 is a sectional view of FIG. 9 as viewed from a direction of an arrow X.

Next, a third embodiment of the curved honeycomb structural body according to the present invention is shown in FIGS. 9 and 10. In this embodiment, pitches between adjacent interior partition walls extending in a direction orthogonal to a radial direction in a cross sectional plane are linearly decreased as the interior partition walls go from the radially inner side to the radially outer side.

The pitches P between adjacent interior partition walls constituting through holes 142 are as follows. (1) The pitches Px between the interior partition walls 22, 122 in a direction of a major axis in an elliptical sectional plane are gradually decreased as the interior partition walls go from the radially inner side to the radially outer side. (2) The pitches Py between the adjacent partition walls 102, 102 in the radial direction in the cross sectional plane are constant.

Figure 11:
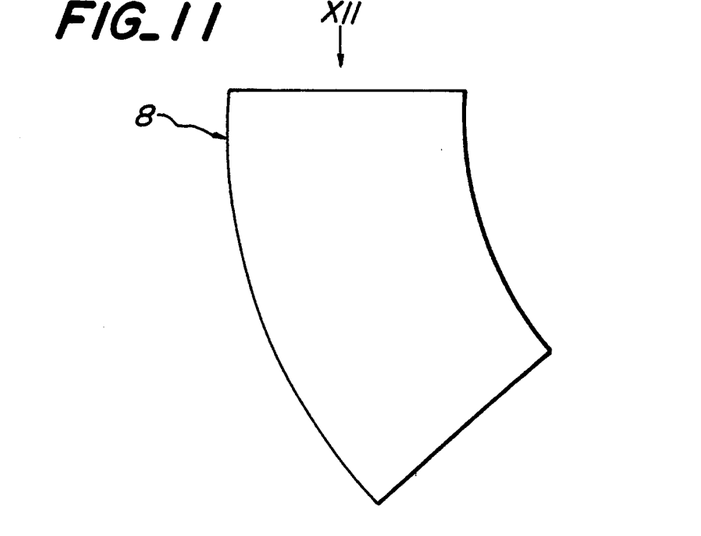
FIG. 11 is a schematic view for illustrating the structure of Example 4 tested in the present invention.
Figure 12:
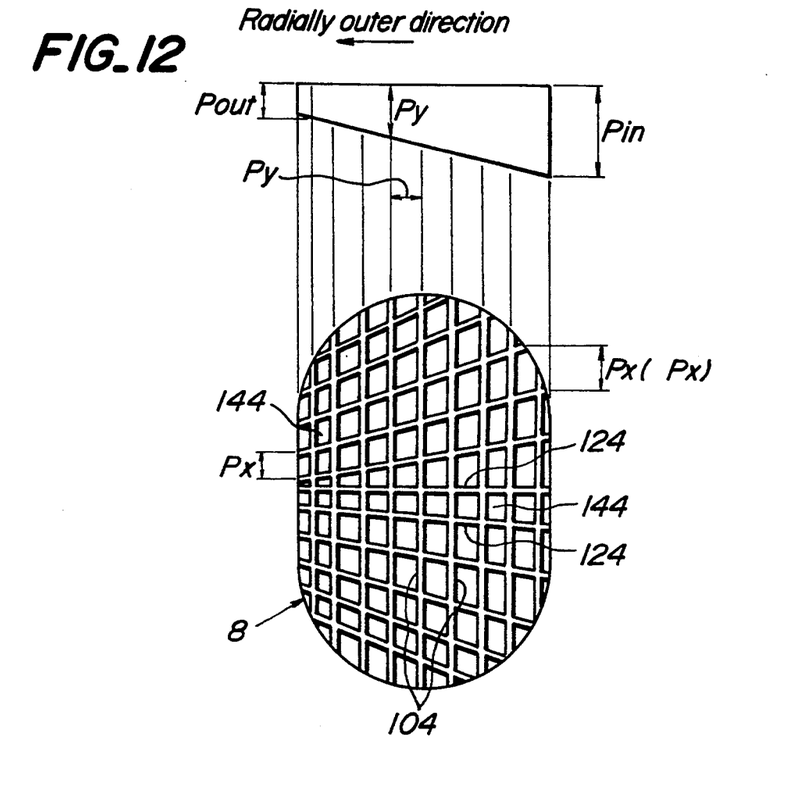
FIG. 12 is a sectional view of FIG. 11 as viewed from a direction of an arrow XII.

Next, a fourth embodiment of the curved honeycomb structural body according to the present invention is shown in FIGS. 11 and 12. In this embodiment, pitches between adjacent interior partition walls in a direction orthogonal to a radial direction in a cross sectional plane are linearly decreased as the interior partition walls go from the radially inner side to the radially outer side.

Pitches P between the adjacent interior partition walls constituting through holes 144 are as follows. That is, (1) the pitches Px between adjacent interior partition walls 124, 124 in a direction of a major axis in an elliptical sectional plane are decreased as the interior partition walls go from the radially inner side to the radially outer side, and (2) the pitches Py between the adjacent interior partition walls 104, 104 in a radial direction in the cross-sectional plane are linearly decreased as the interior partition walls go from the radially inner side to the radially outer side. The pitch Py between the radially adjacent interior partition walls takes a maximum pitch Pin on the radially inner side. The pitch Py is decreased as the interior partition walls go from the radially inner side to the radially outer side, and takes a minimum pitch Pout on the radially outermost side.

In the following, experimental data of invention examples and comparative example are shown in Table 1.

TABLE 1

| | Cell cross-sectional shape | Honeycomb cross-sectional shape | Major axis $D_1$ (mm) | Minor axis $D_2$ (mm) | Effective length of honeycomb structural body on radially outermost side $L_1$ (mm) | Effective length of honeycomb structural body on radially innermost side $L_2$ (mm) | Radius of curvature R (mm) | Maximum pitch between adjacent inner partition walls in radial direction $P_{in}$ (mm) | Minimum pitch between adjacent inner partition walls in radial direction $P_{out}$ (mm) | Maximum pitch between adjacent interior partition walls in a major axis direction in elliptical cross-sectional plane | Minimum pitch between adjacent interior partition walls in a major axis direction in elliptical cross-sectional plane | HC gas residual rate (%) |
|---|---|---|---|---|---|---|---|---|---|---|---|---|
| Example 1 | rectangular | elliptical | 95 | 70 | 145 | 115 | 300 | 2.54 | 1.04 | 1.27 | 1.27 | 8 |
| Example 2 | rectangular | elliptical | 95 | 70 | 145 | 115 | 300 | 2.54 | 1.04 | 1.27 | 1.27 | 9 |
| Example | rectan- | ellip- | 95 | 70 | 145 | 115 | 300 | 1.27 | 1.27 | 2.54 | 1.04 | 9 |

TABLE 1-continued

| | Cell cross-sectional shape | Honey-comb cross-sectional shape | Major axis $D_1$ (mm) | Minor axis $D_2$ (mm) | Effective length of honeycomb structural body on radially outermost side $L_1$ (mm) | Effective length of honeycomb structural body on radially innermost side $L_2$ (mm) | Radius of curvature R (mm) | Maximum pitch between adjacent inner partition walls in radial direction $P_{in}$ (mm) | Minimum pitch between adjacent inner partition walls in radial direction $P_{out}$ (mm) | Maximum pitch between adjacent interior partition walls in a major axis direction in elliptical cross-sectional plane | Minimum pitch between adjacent interior partition walls in a major axis direction in elliptical cross-sectional plane | HC gas residual rate (%) |
|---|---|---|---|---|---|---|---|---|---|---|---|---|
| Example 3 | rectangular | elliptical | 95 | 70 | 145 | 115 | 300 | 2.54 | 1.04 | 2.54 | 1.04 | 7 |
| Example 4 | rectangular | elliptical | 95 | 70 | 145 | 115 | 300 | 2.54 | 1.04 | 2.54 | 1.04 | 7 |
| Comparative Example 1 | square | elliptical | 95 | 70 | 145 | 115 | 300 | 1.27 | 1.27 | 1.27 | 1.27 | 10 |

In Example 1, as shown in FIGS. 1 and 2 and FIGS. 4 and 5, pitches Px between adjacent interior partition walls in a direction of a major axis in an elliptical cross-sectional plane were made constant, and pitches Py between adjacent interior partition walls in the radial direction were varied linearly.

Figure 6:
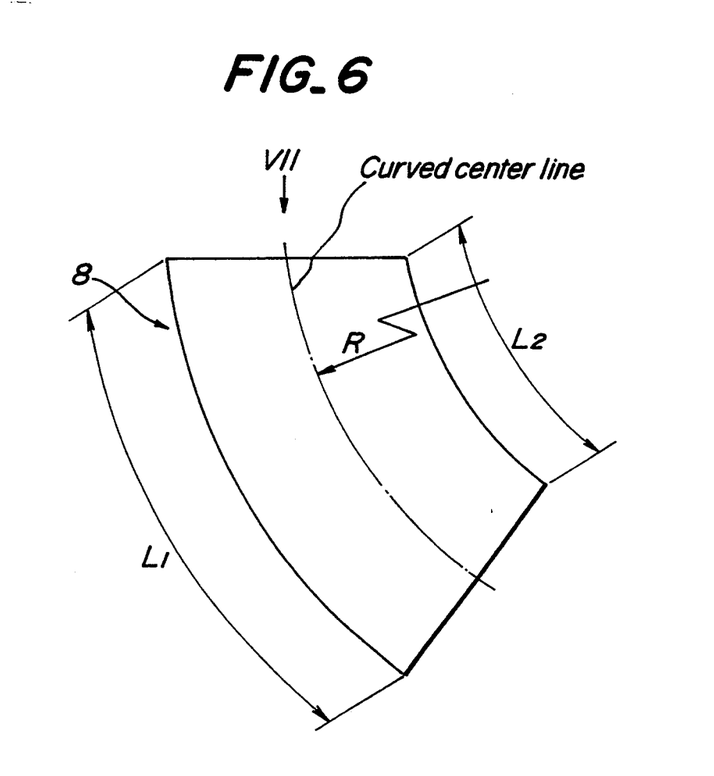
FIG. 6 is a schematic view for illustrating the structure of Example 2 tested in the present invention.
Figure 7:
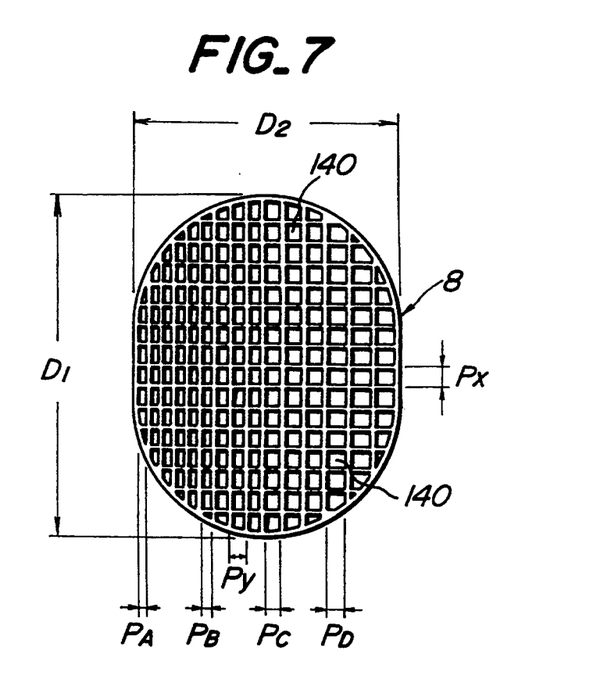
FIG. 7 is a sectional view of FIG. 6 as viewed from a direction of an arrow VII.

In Example 2, as shown in FIGS. 3 and FIGS. 6 and 7, the pitches Px between adjacent partition walls in a major axis direction in an elliptical cross-sectional plane were made constant, and the pitches Py between the radially adjacent partition walls were increased stepwise by four stages of $P_A$, $P_B$, $P_C$ and $P_D$ as the interior partition walls went from the radially outer side to the radially inner side.

In Example 3, the pitches Px between adjacent interior partition walls in the major axis direction in the elliptical cross-sectional plane were decreased as the interior partition walls went from the radially inner side to the radially outer side, and the pitches Py between the radially adjacent interior partition walls were made constant.

In Example 4, the pitches Px between the adjacent interior partition walls in the major axis direction in the elliptical cross-sectional plane were decreased as the interior partition walls went from the radially inner side to the radially outer side, and the pitches between the radially adjacent interior partition walls were linearly decreased as the interior partition walls went from the radially inner side to the radially outer side.

In Comparative Example 1, both the pitches Px between adjacent interior partition walls in a major axis direction in an elliptical cross-sectional plane and the pitches Py between radially adjacent interior partition walls were set equal at a constant value.

An experimental method is as follows. That is, with respect to Examples 1, 2, 3 and 4 as well as Comparative Example 1, a first layer of γ-alumina was formed on the interior partition walls of the honeycomb structural body so as to carry a catalyst, and then a second layer of a noble catalyst metal such as platinum, palladium or rodium as a catalyst was carried thereon. An exhaust gas was flown into the resulting honeycomb structural catalyst carrier from one end face, and discharged from the other end face through curved passages of the honeycomb structural catalyst carrier. The concentration of a hydrocarbon (HC) gas in the exhaust gas discharged was measured, and a HC residual rate was calculated. An engine used for the measurement had an exhaust gas displacement of 2 liters.

As a result of the experiment, the HC gas residual rate was 10% for Comparative Example 1, whereas the HC gas residual rate was 8% for Example 1, 9% for Examples 2 and 3, and 7% for Example 4. Thus, it is seen that the HC gas residual rates were greatly decreased in Examples 1 through 4 according to the present invention as compared with Comparative Example 1. The reason is considered that since flow rate distribution in the radial direction of the curved honeycomb structural body is uniform in Examples 1 through 4, the catalytic power per unit area can be made almost uniform over the entire region from the radially inner side to the radially outer side.

As explained above, according to the curved honeycomb structural body of the present invention having the curved passages, the pitches between the adjacent interior partition walls are set smaller on the radially outer side of the curved portion of the curved honeycomb structure than on the radially inner side thereof. Therefore, the flow rate of the fluid entering the honeycomb structural body from one end and flowing out from the other end can be made relatively uniform at the outlet side.

Consequently, when the catalyst device in which a catalyst is carried onto the inner surfaces of the interior partition walls of the curved honeycomb structural body is used, the efficiency of purifying the exhaust gases can be largely enhanced.

What is claimed is:

1. A curved honeycomb structural body having a number of through holes penetrating therethrough along a direction in which the honeycomb structural body is curved, wherein pitches between adjacent interior partition walls defining said through holes are set smaller on a radially outer side of a curved portion than on a radially inner side thereof.

2. The curved honeycomb structural body according to claim 1, wherein the pitches of the adjacent interior partition walls are gradually decreased linearly as the interior partition walls extend from the radially inner side to the radially outer side.

3. The curved honeycomb structural body according to claim 1, wherein the pitches of the adjacent interior partition walls are gradually decreased stepwise as the interior partition walls extend from the radially inner side to the radially outer side.

4. The curved honeycomb structural body according to claim 1, wherein a cross-sectional shape of each of said through holes is one of square, rectangular, triangular and hexagonal.

5. The curved honeycomb structural body according to claim 4, wherein the cross sectional shape of each of said through holes is square, and the pitches of the interior partition walls extending in a direction orthogonal to the radial direction in a cross sectional plane are constant.

6. The curved honeycomb structural body according to claim 5, wherein a pitch of each of the interior walls extending in the direction orthogonal to the radial direction in the cross sectional plane have an intermediate value between a maximum pitch and a minimum pitch between adjacent interior partition walls extending in the radial direction.

7. The curved honeycomb structural body according to claim 1, wherein a catalyst is carried on surfaces of the interior partition walls.

8. The curved honeycomb structural body according to claim 1, wherein the pitches of the interior partition walls extending in a direction orthogonal to the radial direction in a sectional view are gradually decreased as the interior partition walls extend from the radially inner side to the radially outer side.

* * * * *